(12) United States Patent
Lee

(10) Patent No.: US 9,207,880 B2
(45) Date of Patent: Dec. 8, 2015

(54) PROCESSOR WITH ARCHITECTURALLY-VISIBLE PROGRAMMABLE ON-DIE STORAGE TO STORE DATA THAT IS ACCESSIBLE BY INSTRUCTION

(71) Applicant: Intel Corporation, Santa Clara, CA (US)

(72) Inventor: Victor W. Lee, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/142,734

(22) Filed: Dec. 27, 2013

(65) Prior Publication Data

US 2015/0186077 A1 Jul. 2, 2015

(51) Int. Cl.
*G06F 3/06* (2006.01)
*G06F 9/38* (2006.01)
*G06F 13/28* (2006.01)

(52) U.S. Cl.
CPC ............ *G06F 3/0688* (2013.01); *G06F 3/0604* (2013.01); *G06F 3/0638* (2013.01); *G06F 9/38* (2013.01); *G06F 13/28* (2013.01); *G06F 2003/0695* (2013.01)

(58) Field of Classification Search
CPC ....................................................... G06F 3/0604
USPC .................................................. 708/235, 440
See application file for complete search history.

(56) References Cited

U.S. PATENT DOCUMENTS

| | | | |
|---|---|---|---|
| 6,389,579 B1 * | 5/2002 | Phillips et al. | 716/114 |
| 6,757,700 B1 * | 6/2004 | Druck | 708/204 |
| 6,760,390 B1 * | 7/2004 | Desai et al. | 375/341 |
| 9,015,217 B2 * | 4/2015 | Arnold et al. | 708/235 |
| 2007/0288909 A1 * | 12/2007 | Cheung et al. | 717/136 |
| 2009/0070398 A1 * | 3/2009 | Mejdrich et al. | 708/440 |
| 2013/0262540 A1 * | 10/2013 | Arnold et al. | 708/235 |
| 2014/0222883 A1 * | 8/2014 | Pineiro et al. | 708/523 |

* cited by examiner

*Primary Examiner* — Tammara Peyton
(74) *Attorney, Agent, or Firm* — Vecchia Patent Agent, LLC

(57) ABSTRACT

A processor of an aspect includes an on-die programmable architecturally-visible storage. The processor also includes a decode unit to receive a data access instruction of an instruction set of the processor. The data access instruction to indicate a data address that is to be associated with data to be stored in the on-die programmable architecturally-visible storage, to indicate a data size associated with the data to be stored in the on-die programmable architecturally-visible storage, and to indicate a destination storage location of the processor. An execution unit is coupled with the decode unit and the on-die programmable architecturally-visible storage. The execution unit is on-die with the on-die programmable storage. The execution unit is operable, in response to the data access instruction, to store the data, which is associated with the data address and the data size, in the destination storage location that is to be indicated by the instruction.

32 Claims, 14 Drawing Sheets

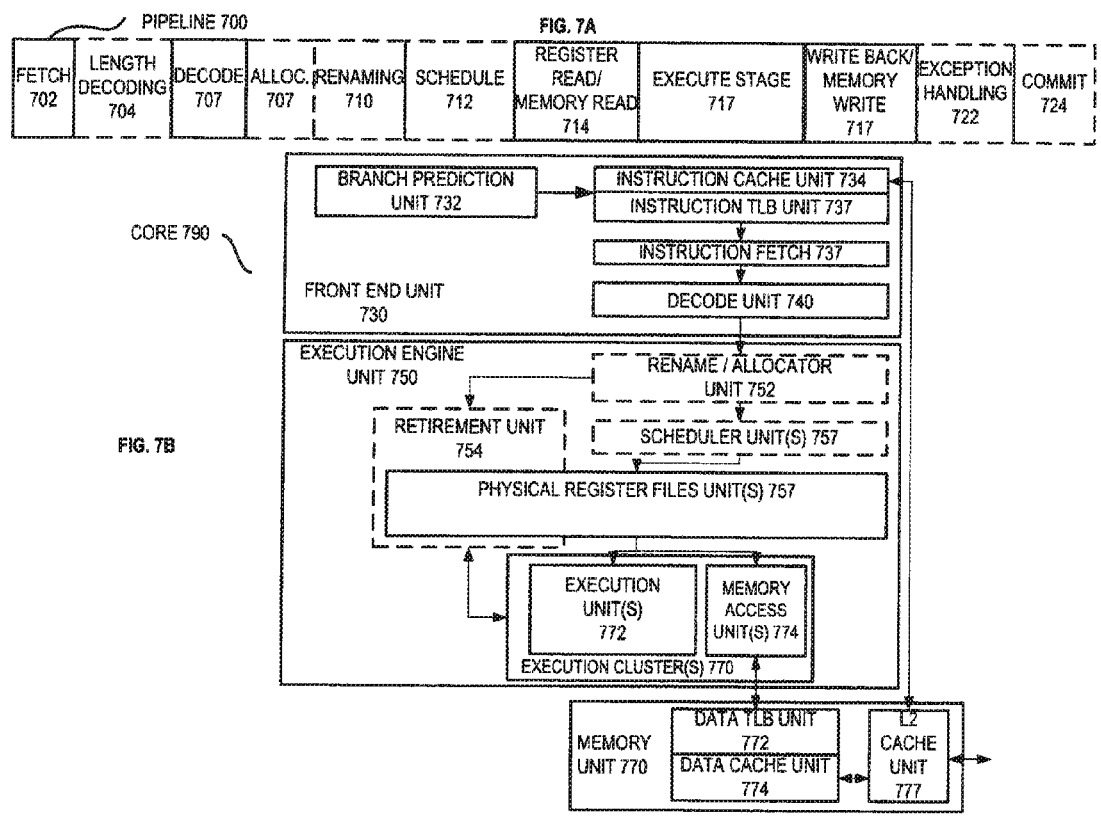

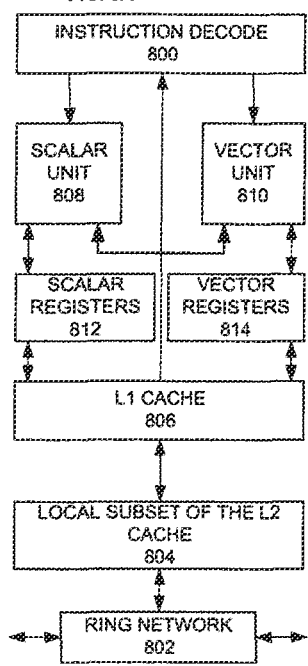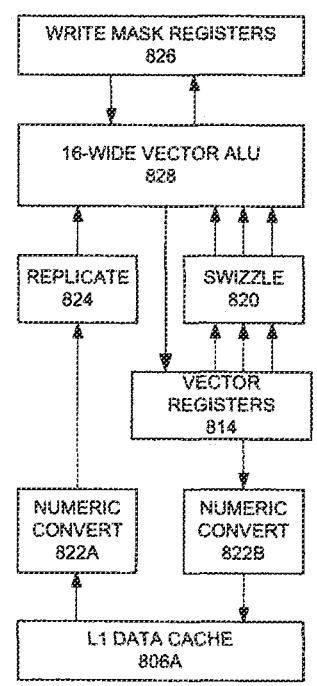

US 9,207,880 B2

PROCESSOR WITH ARCHITECTURALLY-VISIBLE PROGRAMMABLE ON-DIE STORAGE TO STORE DATA THAT IS ACCESSIBLE BY INSTRUCTION

BACKGROUND

1. Technical Field

Embodiments described herein generally relate to processors. In particular, embodiments described herein generally relate to processors having on-die memories to store data.

2. Background Information

Logarithmic, exponential, cosine, sine, hyperbolic sine, arc-tangent, reciprocal square root, and various other transcendental math functions are commonly evaluated in processors. For example, such transcendental math functions are often used in scientific applications, physics-based computational graphics, and other applications where such functions appear.

In order to evaluate certain more common transcendental math functions, some processors include an on-die read only memory (ROM) that stores a hardware lookup table that has approximate or starting values for the transcendental function. The hardware lookup table is typically programmed into the on-die ROM by the processor's manufacturer at the time when the processor is manufactured. During use, when the function needs to be evaluated (e.g., by a software application), an appropriate value may be retrieved from the hardware lookup table. Commonly, the values stored in the table may be those fixed values that the processor's manufacturer believes are the most generally useful and/or useful for the most common applications. In some cases, the retrieved value may have an accuracy and/or precision sufficient for the intended use. In other cases, when higher accuracy and/or precision values are desired, the retrieved value may be iteratively refined in software.

BRIEF DESCRIPTION OF THE DRAWINGS

The invention may best be understood by referring to the following description and accompanying drawings that are used to illustrate embodiments. In the drawings:

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to embodiments of the invention.

FIG. 8A is a block diagram of a single processor core, along with its connection to the on-die interconnect network and with its local subset of the Level 2 (L2) cache, according to embodiments of the invention.

FIG. 8B is an expanded view of part of the processor core in FIG. 8A according to embodiments of the invention.

DETAILED DESCRIPTION OF EMBODIMENTS

Figure 1:
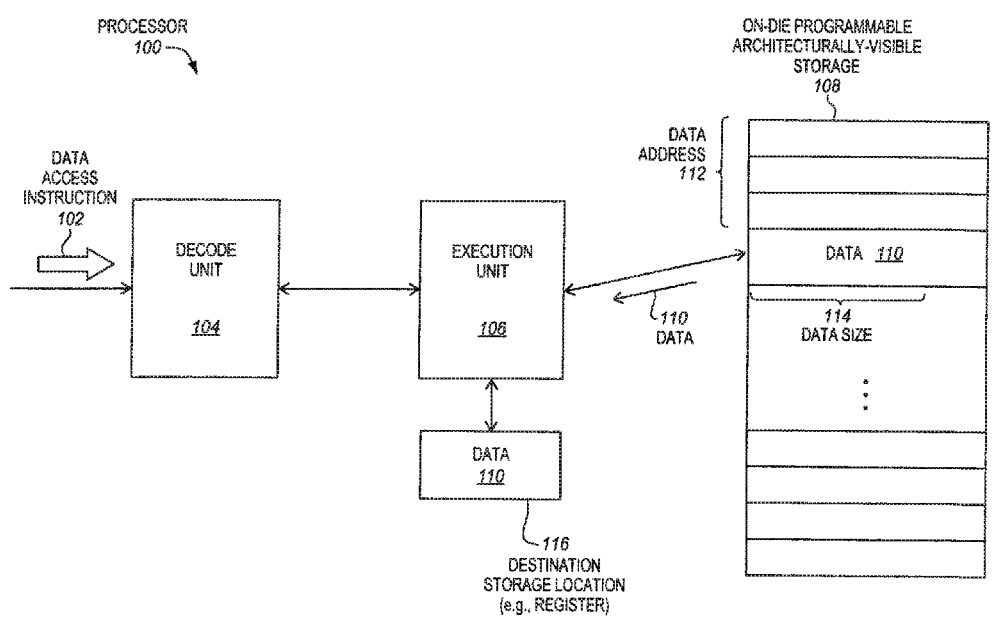
FIG. 1 is a block diagram of an embodiment of a processor operable to perform an embodiment of a data access instruction to access data in programmable architecturally-visible on-die storage.

Disclosed herein are data access instructions to access data in architecturally-visible programmable on-die storage, processors to perform the instructions, methods performed by the processors when performing the instructions, and systems incorporating one or more processors to perform the instructions. In the following description, numerous specific details are set forth (e.g., specific instruction operations, types of on-die storage, ways of storing data in an on-die storage, processor configurations, microarchitectural details, sequences of operations, etc.). However, embodiments may be practiced without these specific details. In other instances, well-known circuits, structures and techniques have not been shown in detail to avoid obscuring the understanding of the description.

One possible drawback to using an on-die ROM to store a hardware lookup table, which is an approach that was discussed in the background section, is that one or more of the manufacturing cost, size, and/or power consumption of the on-die ROM may tend to limit its applicability to storing hardware lookup tables for only certain of the more commonly used and/or more important transcendental functions. For example, processors may include such hardware lookup tables in on-die ROM for the most commonly used functions (e.g., exponential and logarithmic functions), but not for less commonly used functions (e.g., arc-tangent, hyperbolic sine, etc.). Often, during the design and manufacturing process, the manufacturer of the processor may weigh the pros and cons of including a hardware lookup table for such less commonly used transcendental functions, and determine that the costs of including the additional amount of on-die ROM needed to accommodate the hardware lookup tables outweigh the benefits of having the hardware lookup tables. However, such less commonly used transcendental functions often still need to be evaluated at least sometimes. Moreover, in some implementations (e.g., certain types of software applications and/or certain uses), the evaluation of such functions may be widespread and/or may significantly affect performance. If a hardware lookup table is not provided for these functions, then the functions may need to be evaluated by software using a table in system memory. However, such software lookup tables in system memory generally have relatively high access latencies, which generally results in inferior performance.

Another possible drawback to using such an on-die ROM is that the values stored in the on-die ROM are fixed and inflexible. For example, the values stored in the on-die ROM are typically fixed at the time of manufacture of the processor, and generally cannot be changed thereafter (e.g., the programmer and/or software cannot change them). As its name implies, the on-die ROM is "read only," and generally is not writable by the programmer and/or software. Often, the values stored in the hardware lookup table are those expected by the processor's manufacturer to be overall most useful (e.g., useful in the most common and/or widespread and/or important applications). However, for some implementations, the fixed values may have accuracy and/or precision that is either too low or too high for the intended use. If the accuracy and/or precision are too low for the intended use, this may mean that additional refinement in software may be needed, which generally tends to reduce performance. Conversely, if the accuracy and/or precision is too high for the intended use, then essentially more bits were used than were needed, which generally results in greater manufacturing cost, area on die, and/or power consumption. As a result, such fixed values stored in the on-die ROM essentially represent a one-size-fits all solution. The processor manufacturer decides what values to program in the on-die programmable ROM not software and/or the programmer.

FIG. 1 is a block diagram of an embodiment of a processor 100 that is operable to perform an embodiment of a data access instruction 102 to lookup or otherwise access data 108 in programmable architecturally-visible on-die storage 108. In some embodiments, the processor may be a general-purpose processor (e.g., of the type used in desktop, laptop, or other computers). Alternatively, the processor may be a special-purpose processor. Examples of suitable special-purpose processors include, but are not limited to, graphics processors, cryptographic processors, network processors, communications processors, co-processors (e.g., physics co-processors), embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or other types of processors.

During operation, the processor 100 may receive the embodiment of the data access instruction 102. For example, the instruction may be received from an instruction fetch unit, an instruction queue, or the like. The instruction may represent a macroinstruction, assembly language instruction, machine code instruction, or other instruction or control signal of an instruction set of the processor. In some embodiments, the data access instruction may be a user-level instruction capable of being performed by user-level software (e.g., user-level applications not just the operating system or similar privileged and/or supervisory-level software). For example, the user-level instruction may be performed at ring 3 instead of only at ring 0. As will be explained further below, the data access instruction may be operable to cause or result in the processor accessing or looking up data in the programmable architecturally-visible on-die storage 108.

In some embodiments, the data access instruction may explicitly specify (e.g., through one or more fields or a set of bits), or otherwise indicate (e.g., implicitly indicate), a data address 112 associated with desired data 110 to be looked up or otherwise accessed. The term "data address" is used broadly herein to refer to an offset, index, pointer, relative position, displacement, or various ways known in the arts to indicate or identify data stored in a table, list, array, or other datastructure (e.g., indicate a single entry in a table, indicate a single item in a list, etc.). In one particular example, embodiment, a multi-bit value (e.g., 8-bit value or a least significant portion thereof) may indicate a particular entry or index in a table or list. The instruction may specify or indicate the data address in various different ways. In some embodiments, the data address may be provided by an immediate of the instruction. In other embodiments, the data address may be stored a register (e.g., a general-purpose register) that is explicitly specified or implicitly indicated by the instruction. In other embodiments, the data address may be specified through a field or one or more bits of the instruction format. Although in the illustration only single on-die storage 108 is shown, in some embodiments, there may optionally be multiple programmable on-die storage and/or each programmable on-die storage may optionally have multiple tables or other data structures. In such embodiments, the instruction may select or indicate (e.g., have a field to specify, implicitly indicate, etc.) the on-die storage 108 and/or the data structure. In such cases the data address may be relative to the start (e.g., first entry) of the indicated programmable on-die storage and/or data structure. The particular on-die storage or data structure may be specified or indicated by a field of the instruction, an immediate, a value in a register, or may be implicit to the instruction.

In some embodiments, the data access instruction may optionally explicitly specify (e.g., through one or more fields or a set of bits), or otherwise indicate (e.g., implicitly indicate), a data size 114 associated with desired data 110 to be looked up or otherwise accessed. The data size may specify or indicate the size of the desired data. Examples of suitable data sizes include, but are not limited to, 1-bit, 2-bits, 3-bits, 4-bits, 5-bits, 6-bits, 7-bits, 8-bits, 16-bits, 32-bits, 64-bits, and 128-bits to name just a few examples. Notice that in some embodiments, the data size may optionally be less than one 8-bit byte (e.g., may be 1-bit, 2-bits, 3-bits, 4-bits, 5-bits, 6-bits, or 7-bits), if such precisions are desired for the particular implementation. The data size may be specified in different ways. In some cases, one or more bits may have a particular value to explicitly specify a number of bits, bytes, words, doublewords, or quadwords. For example, "01" may be used to specify one byte. In other cases, one or more bits may be used to provide a code (e.g., an arbitrary code following any desired convention) to indicate one of several different data sizes. For example, a two-bit code may have a value "00" to indicate one 8-bit byte, "01" to indicate one 16-bit word, "10" to indicate one 32-bit doubleword, or "11" to indicate one 64-bit quadword). Alternatively, according to a different example convention, the two-bit code may have a value "00" to indicate one 2-bit segment, "01" to indicate one 8-bit byte, "10" to indicate one 16-bit doubleword, or "11" to indicate one 64-bit quadword. Three or more bits may be used to provide even more different size options. In some embodiments, the data size may be specified through a field or one or more bits of the instruction format. In other embodiments, the data size may be provided by an immediate of the instruction.

It is not required that the instruction explicitly specifies or indicates the data size. In other embodiments, the data size may be implicitly indicated by the instruction (e.g., a size may be implicit to an opcode of the instruction). For example, different instructions with different opcodes may optionally be provided for different corresponding single data sizes (e.g., a first instruction with a first opcode may be used for a first data size (e.g., one 8-bit byte), a second instruction with a second different opcode may be used for a second different data size (e.g., one 16-bit word), and so on).

In the case of the data size being less than an 8-bit byte, one possible way of address calculation is to shift the data address by an appropriate number of bits. For example, in the case of a 1-bit addressable memory, three extra bits may optionally be used in the address. By way of example, to address an eighth bit of byte 1 an address of 1000 may be used, the ninth bit in the memory may be addressed as 1001, and so on. In some embodiments, the data access instruction may explicitly specify (e.g., through one or more fields or a set of bits), or otherwise indicate (e.g., implicitly indicate), a destination storage location 116 where retrieved, obtained, or otherwise accessed data 110 may be stored responsive to the data access instruction. By way of example, the destination storage location may be a processor register (e.g., a general-purpose register or a packed data register), or other storage location.

Referring again to FIG. 1, the processor includes a decode unit or decoder 104. The decode unit may receive and decode instructions, including the data access instruction. The decode unit may output one or more microinstructions, micro-operations, micro-code entry points, decoded instructions or control signals, or other relatively lower-level instructions or control signals that reflect, represent, and/or are derived from the data access instruction. The one or more relatively lower-level instructions or control signals may implement the relatively higher-level data access instruction through one or more relatively lower-level (e.g., circuit-level or hardware-level) operations. In some embodiments, the decode unit may include one or more input structures (e.g., input port(s), input interconnect(s), an input interface, etc.) to receive the instruction, an instruction recognition logic coupled with the input structures to receive and recognize the instruction, a decode logic coupled with the recognition logic to receive and decode the instruction, and one or more output structures (e.g., output port(s), output interconnect(s), an output interface, etc.) coupled with the decode logic to output one or more corresponding lower level instructions or control signals. The recognition logic and the decode logic may be implemented using various different mechanisms including, but not limited to, microcode read only memories (ROMs), look-up tables, hardware implementations, programmable logic arrays (PLAs), and other mechanisms used to implement decode units known in the art.

In some embodiments, instead of the data access instruction being provided directly to the decode unit, an instruction emulator, translator, morpher, interpreter, or other instruction conversion module may optionally be used. Various different types of instruction conversion modules are known in the arts and may be implemented in software, hardware, firmware, or a combination thereof. In some embodiments, the instruction conversion module may be located outside the instruction processing processor, such as, for example, on a separate die and/or in a memory (e.g., as a static, dynamic, or runtime instruction emulation module). By way of example, the instruction conversion module may receive the data access instruction, which may be of a first instruction set, and may emulate, translate, morph, interpret, or otherwise convert the data access instruction into one or more corresponding or derived intermediate instructions or control signals, which may be of a second different instruction set. The one or more instructions or control signals of the second instruction set may be provided to a decode unit that is operable to decode instructions or control signals of the second instruction set. The decode unit may decode the received one or more instructions or control signals of the second instruction set into one or more lower-level instructions or control signals executable by native hardware of the processor (e.g., one or more execution units).

Referring again to FIG. 1, the processor also includes the on-die programmable architecturally-visible storage 108. The on-die programmable architecturally-visible storage may be used to store data. The data access instruction may be performed to lookup or otherwise access desired data 110 from the on-die programmable architecturally-visible storage. The on-die programmable architecturally-visible storage is on-die and/or on-chip with other portions of the processor (e.g., the execution unit). The on-die programmable architecturally-visible storage is programmable. For example, the storage may include a type of data storage (e.g., circuitry and/or a device) that is capable of having data stored therein, or otherwise being programmed, after initial manufacture. In some embodiments, a software programmer and/or software may be able to program the on-die programmable storage, not just the manufacturer and/or designer of the processor. That is, the on-die programmable storage may be programmed during processor runtime (e.g., while the processor is decoding and executing instructions). In one example, the on-die programmable storage may be programmed during boot. In some embodiments, the on-die programmable storage may include a type of data storage (e.g., circuitry and/or a device) that is capable of being re-programmed multiple times (e.g., initial data can be stored thereon, new data can be stored therein overwriting the initial data, and so on). The on-die programmable architecturally-visible storage is architecturally visible. For example, in some embodiments, a software programmer and/or user-level software may be able to view or access the architecturally-visible storage through execution of a user-level instruction of an instruction set of the processor (e.g., the data access instruction). In some embodiments, the on-die programmable architecturally-visible storage may include a type of random-access memory (RAM). For example, in some embodiments, static random-access memory (SRAM) may be used. Alternatively, dynamic RAM (DRAM), or non-volatile RAM (NVRAM) may optionally be used. Furthermore, current or future substitutes for SRAM, DRAM, and NVRAM may optionally be used instead. Also, other types of memory suitable for implementing instruction and/or data caches of processors known now, or developed in the future, may also optionally be used. In some embodiments, the on-die programmable storage may optionally have more than two ports and/or more than two banks, which may help to increase access throughput, although this is not required. In some embodiments, the on-die programmable architecturally-visible storage is part of a general-purpose processor and is not part of a Field Programmable Gate Array (FPGA).

Referring again to FIG. 1, the execution unit 106 is coupled with the decode unit 104, the on-die programmable architecturally-visible storage 108, and the destination storage location 116. The execution unit is operable in response to and/or as a result of the data access instruction (e.g., in response to one or more instructions or control signals decoded or otherwise converted from the data access instruction) to lookup or otherwise access data 110 in the on-die programmable storage 108. For example, in some embodiments, the data access instruction may cause the processor to locate or identify a particular data 110 that is indicated by the data address 112 of the data access instruction. The data access instruction may also cause the processor to retrieve, obtain, or otherwise access an amount of the indicated data 110 equal to or at least based on the data size 114 indicated by the data access instruction. In some embodiments, the data access instruction may also cause the processor to store the retrieved or otherwise accessed data 110, which is associated with the data address 112 and the data size 114, in a destination storage location 116 indicated by the data access instruction. Examples of suitable destination storage locations include, but are not limited to, general-purpose registers of the processor, packed data registers of the processor, and other storage locations of the processor. Alternatively, memory locations or other destination storage locations may optionally be used, if desired. The execution unit and/or the processor may include specific or particular logic (e.g., transistors, integrated circuitry, or other hardware potentially combined with firmware (e.g., instructions stored in non-volatile memory) and/or software) that is operable to perform the data access instruction.

The on-die programmable architecturally-visible storage 108 and data access instruction 102 may offer various potential advantages. For one thing, the on-die programmable architecturally-visible storage is not limited to only being programmed by the designer and/or manufacturer of the processor as was the case of the on-die ROM discussed in the background section. Rather, for example, software programmer and/or software may program the on-die programmable architecturally-visible storage with data. As a result, instead of being limited to just those types of transcendental functions selected by the processor designer and/or manufacturer at the time of manufacture (e.g., generally the more prevalent ones), the programmer and/or software may select the type of transcendental function, the type of function with a limited output range, or other type of function, or other data (e.g., a datastructure having Fast Fourier Transform twiddle factors, coefficients used in an algorithm, a user-defined logic truth table, etc.) desired to be stored in the on-die programmable architecturally-visible storage for the particular implementation. For example, if an arc-tangent, hyperbolic sine, or other less commonly used transcendental function isn't otherwise available through an on-die ROM programmed by the processor's manufacturer, then the programmer and/or software may program the on-die programmable architecturally visible storage with data/values for such a function. Moreover, the on-die programmable storage may be programmed with other types of data at the programmer's discretion not just transcendental functions. For example, it may be used as a sort of scratch pad memory to program various different types of functions, values, or data desired to be stored for the particular implementation. That is, the programmer and/or software may select what particular type of function is to be stored in the on-die programmable architecturally-visible storage. In cases where such additional transcendental functions need to be evaluated, and especially in cases where the evaluation of these functions is prevalent, this capability may help to significantly improve performance. For example, accessing values from the on-die storage typically has much lower latencies than if the values were accessed from system memory.

For another thing, the on-die programmable architecturally-visible storage 108 is not limited to only being programmed to have values with accuracies and/or precisions selected by the designer and/or manufacturer of the processor, as was the case of the on-die ROM discussed in the background section. Rather, for example, a software programmer and/or software may program the on-die programmable architecturally-visible storage with values having a precision and/or accuracy that are appropriate for the particular implementation. That is, instead of the precisions and/or accuracies of the values being static or inflexible, as in the case of the on-die ROM discussed in the background section, the on-die programmable architecturally-visible storage may allow flexible accuracies and/or precisions that may be programmed by the software programmer and/or software. In some cases, this may allow a software programmer and/or the software to obtain a low accuracy and/or low precision number quickly, which may not take much storage, instead of having to determine a higher precision number more slowly. For example, in various embodiments, each data may have only 1-bit, 2-bits, 3-bits, 4-bits, 5-bits, 6-bits, 7-bits, 8-bits, or some other relatively low number of bits desired for the particular implementation. By way of example, such low accuracy and/or low precision numbers may be suitable when determining if the values are above or below a threshold, etc. For example, a 1-bit or 2-bit value may be used to designate whether a value of a transcendental function is above or below a threshold, may be used to indicate if a particle in flight is to turn right or left, etc. In some applications, such low precision values may be sufficient for the intended use, and may allow a large number of such values to be stored in a relatively small amount of on-die storage. In other embodiments, a relatively high precision value, such as a 64-bit or 128-bit value may be stored. In any event, the software and/or the programmer may be allowed to decide what precision values to be stored in the on-die programmable storage.

In addition, the on-die programmable architecturally-visible storage 108 generally allows greater control over what data is stored therein than an ordinary instruction and/or data cache commonly found in processors. For one thing, it may be relatively more dedicated to a particular use and/or type of data selected by a programmer and/or software. For example, the on-die programmable architecturally-visible storage may be dedicated to storing values for a particular user-selectable function (e.g., a transcendental function). In contrast, a data cache is generally not dedicated to any such particular user-selectable use and/or type of data. Specifically, such a data cache is generally not dedicated to storing values for one or more transcendental or other functions. Rather, various other types of data brought in from memory are typically stored in the data cache irrespective of whether or not they are associated with the transcendental or other function. The data cache also generally uses a cache data replacement mechanism and/or a data eviction mechanism that is often based on an age of data (e.g., according to a least recently use metric) and/or based on modification of data to autonomously evict data from the cache without substantial involvement of software. For example, some caches use the well-known MESI protocol, or other similar protocols. In some embodiments, the on-die programmable architecturally-visible storage does not include such an autonomous cache data replacement mechanism and/or data eviction mechanism. The dedicated on-die programmable architecturally-visible storage may allow relatively greater control of what data is stored therein and remains therein. In some embodiments, specific instructions may be included to add data to or remove data from the on-die programmable storage and it may remain in there unless these specific instructions are used, which is generally not the case for a cache having a replacement policy. Conversely, what type of data is stored in the ordinary data cache is generally less deterministic and less easy to control. Data may be evicted from the ordinary data cache by other types of data not related to the one or more transcendental or other functions. However, data generally would not be evicted from the on-die programmable storage by data other than the one or more transcendental or other functions or other type of data that the programmer and/or software selected to be in the case. In some embodiments, software and/or a programmer may explicitly control what data is or is not in the on-die programmable storage. Moreover, in some embodiments, the on-die programmable storage need not be coherent with any memory (e.g., need not implement a coherency policy or mechanism).

To avoid obscuring the description, a relatively simple processor 100 has been shown and described. In other embodiments, the processor may optionally include other well-known processor components. Possible examples of such components include, but are not limited to, an instruction fetch unit, instruction and data caches, second or higher level caches, out-of-order execution logic, an instruction scheduling unit, a register renaming unit, a retirement unit, a bus interface unit, instruction and data translation lookaside buffers, prefetch buffers, microinstruction queues, microinstruction sequencers, other components included in processors, and various combinations thereof. Numerous different combinations and configurations of such components are suitable. Embodiments are not limited to any known combination or configuration. Moreover, embodiments may be included in processors have multiple cores, logical processors, or execution engines at least one of which has a decode unit and an execution unit to perform an embodiment of a data access instruction.

Figure 2:
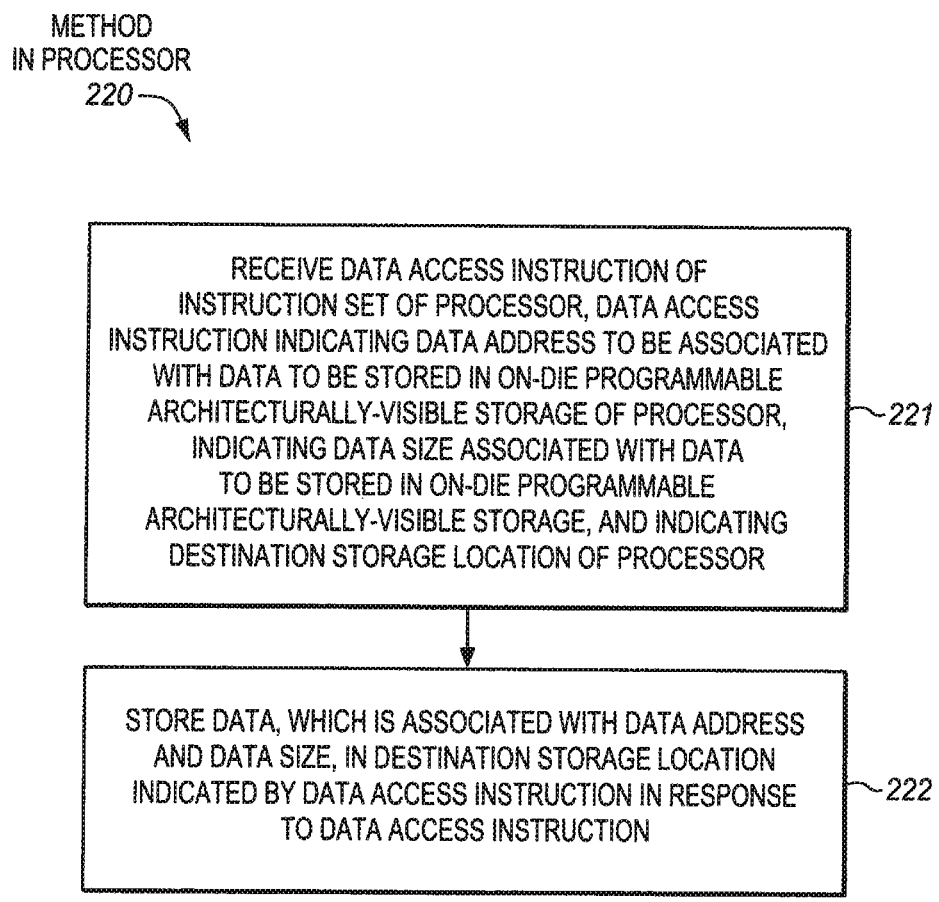
FIG. 2 is a block flow diagram of an embodiment of a method of performing an embodiment of a data access instruction.

FIG. 2 is a block flow diagram of an embodiment of a method 220 of performing an embodiment of a data access instruction. In various embodiments, the method may be performed by a processor, instruction processing apparatus, or other digital logic device. In some embodiments, the operations and/or method of FIG. 2 may be performed by and/or within the processor of FIG. 1. The components, features, and specific optional details described herein for the processor of FIG. 1, including the on-die programmable architecturally-visible storage, also optionally apply to the operations and/or method of FIG. 2. Alternatively, the operations and/or method of FIG. 2 may be performed by and/or within a similar or different processor or apparatus. Moreover, the processor of FIG. 1 may perform operations and/or methods the same as, similar to, or different than those of FIG. 2.

The method includes receiving the data access instruction, at block 221. In various aspects, the data access instruction may be received at a processor, an instruction processing apparatus, or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). In some embodiments, the data access instruction may be a user-level instruction of an instruction set of the processor. The data access instruction may specify or otherwise indicate a data address associated with or indicating data to be accessed. In some embodiments, the data access instruction may specify or otherwise indicate a data size associated with or pertaining to the data to be accessed. The various ways of specifying or indicating the data address and data size discussed elsewhere herein are suitable.

At block 222, data may be stored in a destination storage location (e.g., an architectural register or other storage location of the processor) indicated by the data access instruction, in response to and/or as a result of the data access instruction. In some embodiments, the data stored in the destination storage location may have been retrieved from an on-die programmable architecturally-visible storage of the processor. In some embodiments, the data stored in the destination storage location may have been retrieved from a location or portion of the on-die programmable architecturally-visible storage that is indicated by the data address indicated by the data access instruction. In some embodiments, an amount of the data stored in the destination storage location may be equal to or at least based on a data size indicated by the data access instruction. Examples of suitable storage locations include, but are not limited to, architectural registers of the processor (e.g., general-purpose registers, packed data registers, etc.). Alternatively, memory locations or other destination storage locations may optionally be used. In some embodiments, the on-die programmable storage may optionally have any of the characteristics described elsewhere herein for the on-die programmable storage.

The illustrated method involves architectural operations (e.g., those generally visible from a software perspective). In other embodiments, the method may optionally include one or more microarchitectural operations. By way of example, the instruction may be fetched, decoded, scheduled out-of-order, an execution unit may perform microarchitectural operations to implement the data access instruction, etc.

FIGS. 1-2 show and describe primarily instructions that access a single data value from the on-die programmable architecturally visible storage using a single corresponding data address. However, other embodiments may access a plurality of data items or values from a plurality of potentially/optionally non-contiguous locations or data addresses in the on-die programmable architecturally-visible storage. For example, the instruction may indicate two or more data addresses (e.g., two, four, eight, sixteen, etc.), each optionally/potentially being able to specify a non-contiguous location in a table or other data structure. For example, the instruction may specify four data addresses for entries three, seventeen, one hundred eighty, and ninety one in a table. In response to the instruction, multiple data may be accessed or retrieved from the corresponding data address and stored in a destination storage location in response to the single instruction. In some embodiments, the instruction may have multiple fields in the instruction format to specify the at least two data addresses. In other embodiments, the instruction may indicate a source operand (e.g., a register) having multiple data addresses. For example, in some embodiments, the instruction may indicate a source packed data register or other source packed data operand having a plurality of packed data elements that each include a data address. In some embodiments, the instruction may indicate a packed data operand (e.g., a packed data register) as a destination operand. Multiple retrieved data items may be stored in multiple packed data elements of the destination packed data operand. Such embodiments may allow multiple data to be retrieved with a single instruction. Moreover, this may also potentially help to prepare the data items for subsequent packed data or vector processing.

Different ways are contemplated for programming or storing data in an on-die programmable and architecturally-visible storage. In some embodiments, a processor may have in its instruction set an instruction that when performed is operable to cause the processor to store data into the on-die programmable and architecturally-visible storage.

Figure 3:
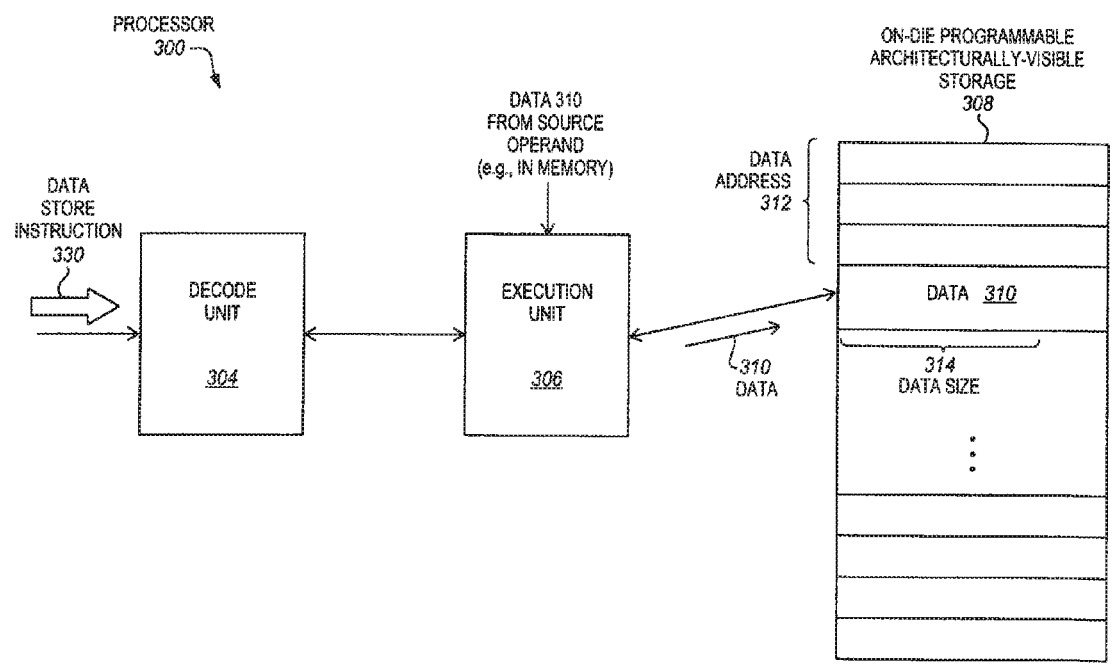
FIG. 3 is a block diagram of an embodiment of a processor that is operable to perform an embodiment of a data store instruction to store data in an on-die programmable and architecturally-visible storage.

FIG. 3 is a block diagram of an embodiment of a processor 300 that is operable to perform an embodiment of a data store instruction 330 to store data 310 in an on-die programmable and architecturally-visible storage 308. The processor includes a decode unit 304, an execution unit 306, and the on-die programmable architecturally-visible storage 308. The processor, decode unit, execution unit, and on-die programmable architecturally-visible storage of FIG. 3 may optionally have some or all of the characteristics of the correspondingly named components of FIG. 1. To avoid obscuring the description, the different and/or additional characteristics of the components of FIG. 3 will primarily be described, without repeating all the optionally common characteristics.

During operation, the processor 300 may receive the embodiment of the data store instruction 330. For example, the instruction may be received from an instruction fetch unit, an instruction queue, or the like. The data store instruction may represent a macroinstruction, assembly language instruction, machine code instruction, or other instruction or control signal of an instruction set of the processor. In some embodiments, the data store instruction may represent a user-level instruction that can be performed by user-level software not just an operating system, hypervisor, or similar privileged and/or supervisory software. In other embodiments, the data store instruction may represent a system-level instruction that is reserved for privileged and/or supervisory software, such as, for example, an operating system, virtual machine monitor, or the like.

In some embodiments, the data store instruction 330 may explicitly specify (e.g., through one or more fields or a set of bits), or otherwise indicate (e.g., implicitly indicate), a source operand. The source operand may include the data 310 that is to be stored into the on-die programmable architecturally-visible storage 308. In some embodiments, the source operand may be a memory location in system memory. In other embodiments, the source operand may be an architectural register of the processor (e.g., a general-purpose register, packed data register, etc.). In some embodiments, the data store instruction may explicitly specify, or otherwise indicate, a data address 312 associated with the data 310 to be stored in the on-die programmable and architecturally-visible storage 308. The data address 312 may indicate where the data 310 is to be stored in the storage 308. In some embodiments, if there are multiple on-die storage and/or multiple data structures, the instruction may specify or otherwise indicate the particular on-die storage and/or data structure. The various ways mentioned for the data access instruction are also suitable for the data store instruction. In some embodiments, the data store instruction may optionally explicitly specify or otherwise indicate a data size 314 associated with the data 310 to be stored into the on-die programmable and architecturally-visible storage 308. The data size 314 may indicate a size of the data 310 (e.g., whether it is 8-bits, 16-bits, 32-bits, or 64-bits). The data address and data size may have the characteristics previously described for the data access instruction.

The decode unit 304 may receive and decode the data store instruction 330. The execution unit 306 may execute the decoded data store instruction. In some embodiments, the execution unit may be operable in response to and/or as a result of the data store instruction (e.g., in response to one or more instructions or control signals decoded or otherwise converted from the data store instruction) to store the data 310 from the source operand indicated by the data store instruction 330 to the on-die programmable architecturally visible storage 308. In some embodiments, the data 310 may be stored to a location or portion of the storage 308 identified by, or at least based on, the data address 312 indicated by the data store instruction. In some embodiments, a size or amount of the data 310 stored from the source operand to the storage 308 may be equal to, or at least based on, the data size 314 indicated by the data store instruction. The execution unit and/or the processor may include specific or particular logic (e.g., transistors, integrated circuitry, or other hardware potentially combined with firmware (e.g., instructions stored in non-volatile memory) and/or software) that is operable to perform the data store instruction.

The on-die programmable architecturally-visible storage 308 may have any of the characteristics described elsewhere herein (e.g., any of the characteristics described for the storage 108 of FIG. 1). For example, the storage 308 may include a type of data storage (e.g., circuitry and/or a device) that is capable of being programmed (e.g., having data stored therein) after initial manufacture and/or while the processor is running a software program. In some embodiments, a software programmer and/or software may be able to program the on-die programmable storage 308, not just the manufacturer and/or designer of the processor. In some embodiments, the on-die programmable storage 308 may include a type of data storage (e.g., circuitry and/or a device) that is capable of being re-programmed multiple or many times (e.g., potentially each time the processor is turned on).

Advantageously, the on-die programmable architecturally-visible storage 308 may be programmed with data during processor runtime, by performing a data store instruction (e.g., a user-level data store instruction). The on-die programmable architecturally-visible storage may be used to store data of a type and having characteristics (e.g., data size, accuracy, precision, etc.) selected by a programmer and/or software instead of just a designer and/or manufacturer of the processor. This may allow the programmer and/or software to store data of a type, size, accuracy, and precision, which is desired for the particular implementation.

To further illustrate certain concepts, consider one non-limiting example of a possible use of the on-die programmable architecturally-visible storage 308. Initially, a datastructure may be created in system memory. Examples of suitable datastructures include, but are not limited to, tables, arrays, lists, and other similar datastructures known in the arts. The datastructure may include an ordered arrangement of different data values. The scope of the invention is not limited to any known type of data. However, in various examples the data may be values of a transcendental or other function, coefficients of an algorithm (e.g., a Fast Fourier Transform algorithm), values of a user-defined logic truth table, or the like. As previously mentioned, accessing data from such a datastructure in system memory may tend to have relatively large latencies, as compared to if the data were instead accessed from an on-die storage location. For example, the time needed to access data from memory may take an order of magnitude or more time that would be needed to access the data from an on-die storage location. To help improve performance, the data from the datastructure may be loaded, moved, or otherwise stored from the system memory to the on-die programmable architecturally-visible storage. In some embodiments, multiple data store instructions (e.g., similar to data store instruction 330) may be performed to store the data from the datastructure in the system memory piece-by-piece to the on-die programmable architecturally-visible storage. For example, each data store instruction may potentially store a single data value having a size equal to the data size from the system memory to the on-die programmable architectural-visible storage. That is, a software-driven approach may be used in which software and/or a programmer is responsible for manually or explicitly moving the datastructure from the system memory to the on-die programmable architecturally-visible storage. One possible advantage of such an approach is that the programmer and/or the software are able to know relatively deterministically or precisely what data is stored in the on-die programmable architecturally-visible storage. Additionally, it is possible to know that the latency of accessing the data would be that of the on-die programmable architecturally-visible storage not that of system memory. However, one potential drawback with such an approach is the additional effort of explicitly or manually transferring the data.

Figure 4:
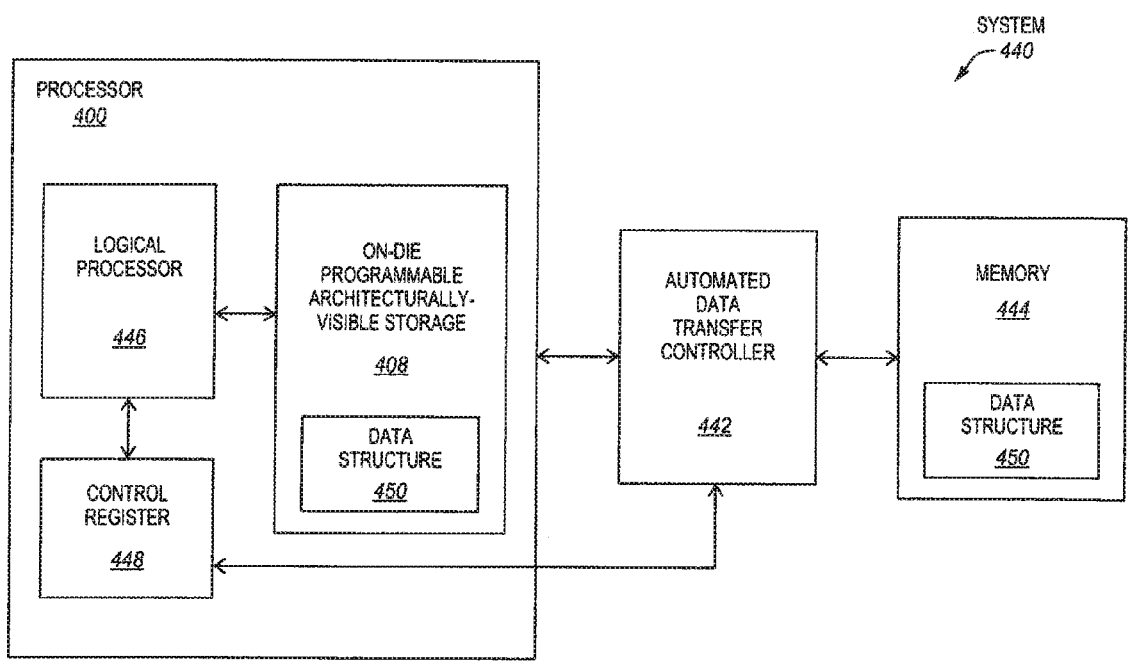
FIG. 4 is a block diagram of an embodiment of a system having an automated data transfer controller to transfer data from memory to an on-die programmable architecturally visible storage.

FIG. 4 is a block diagram of an embodiment of a system 440 having an automated data transfer controller 442 to transfer data from system memory 444 to an on-die programmable architecturally-visible storage location 408. The system includes a processor 400, the automated data transfer controller 442 (e.g., a direct memory access (DMA) controller), and the system memory 444. The processor has a logical processor 446, such as, for example, a core, hardware thread, or other logical processor capable of maintaining an architectural state. The processor also has a control register 448 and an on-die programmable architecturally-visible storage 408. The on-die programmable architecturally-visible storage may be similar to, or the same as, those mentioned elsewhere herein.

Initially, the logical processor 446 may initiate an automated data transfer (e.g., a DMA transfer). For example, the logical processor may store information to control the automated data transfer in the control register 448. By way of example, the logical processor may store a start of data to be transferred (e.g., a source address in the memory) and a size of the data to be transferred (e.g., a number of 8-bit bytes, 16-bit words, 32-bit doublewords, or 64-bit quadwords) in the control register. As an example, the logical processor may store a start of a datastructure 450 stored in the memory and a size of the datastructure. In some cases, the logical processor may also signal the memory and the automated data transfer controller about the data transfer.

Once the data transfer operation has been initiated, the automated data transfer controller 442 may begin to transfer data from the memory to the on-die programmable and architecturally-visible storage using the information in the control register. In some embodiments, the automated data transfer controller may represent a direct memory access (DMA) controller and/or a data transfer controller operable to transfer data without involvement of a central processing unit (CPU). For example, the automated data transfer controller may autonomously store the data of the datastructure piece-by-piece until all of the specified data has been stored in the on-die programmable architecturally-visible storage.

Advantageously, by using such an approach the programmer and/or the software does not need to manually or explicitly transfer the data (e.g., through multiple data store instructions). Further, the programmer and/or the software are able to know relatively well what data is stored in the on-die programmable architecturally-visible storage. It is also known that the latencies for accessing such data should be those of the on-die programmable and architecturally-visible storage not those of system memory.

In other embodiments, yet another way to program the on-die programmable storage is by memory mapped input/output (I/O). The programmer may first set up an I/O region that corresponds to the on-die storage, and then use I/O instructions (e.g., an out instruction) to program the memory.

In some embodiments, user-level software may be responsible for storing data in the on-die programmable storage. In such embodiments, the user-level software may also be responsible for handling contents of the on-die programmable storage during context switches. In one aspect, during a context switch, the contents of the on-die programmable storage may be flushed. Subsequently, the contents may be reloaded to the on-die programmable storage when the context is swapped back in. In other embodiments, the context switch may store the contents of the on-die programmable storage to a user stack. In other embodiments, instead of the on-die programmable storage being programmed by user-level software at run time, the on-die programmable storage may be programmed through system firmware (e.g., during boot). The contents of the on-die programmable storage may provide a fixed context for all programs and contexts that run on the machine. In such embodiments, the contents of the on-die programmable storage do not need to be flushed or switched out on context switches, but may instead be kept in the on-die programmable storage and used, if desired, by all such contexts. Also, the costs of programming the on-die programmable storage only need to be incurred once at startup of the machine.

In other embodiments, the on-die programmable storage may represent a dedicated cache structure. When the data lookup instruction is performed, it may check the dedicated cache structure. If the desired data is not in the dedicated cache structure, then the desired data may be retrieved from main memory on-demand. In some embodiments, a relatively small sized cache line size may be brought in, such as, for example, no more than eight bytes, no more than four bytes, etc. In many conventional caches, much larger cache lines are often brought in, such as, for example, 64-bytes. The smaller cache line sizes may help to reduce the amount of unneeded data in the dedicated cache structure. The data may be stored in the cache. Subsequent accesses may find the same data in the cache and not need to go to memory. However, other data may also potentially evict data from this dedicated cache structure. It may not be known in advance whether or not desired data will be in this dedicated cache structure. If the data is in this dedicated cache structure, then relatively low data access latencies may be observed. Conversely, if the data is not in this dedicated cache structure, then relatively high data access latencies may be observed. That is, the programmer and/or software has less control and less knowledge of whether or not data will be in the cache and the latencies of accessing such data. However, this approach has an advantage that explicit programming to transfer data into the cache is not needed. In some embodiments, the cache may optionally be multi-ported and/or multi-banked to help provide additional access bandwidth.

Figure 5:
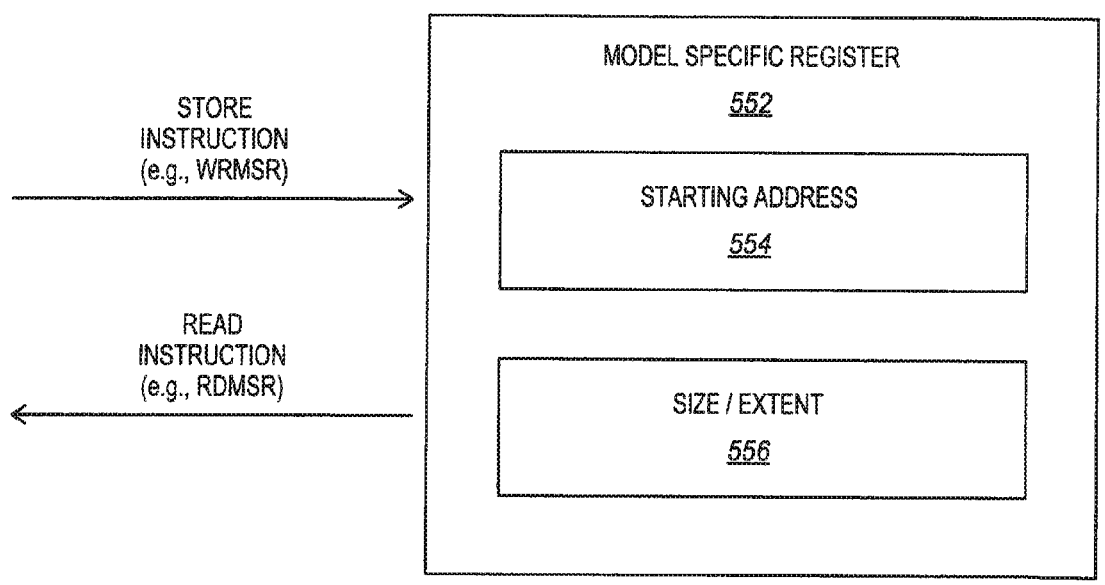
FIG. 5 is a block diagram of an embodiment of a control register that is operable to store information about an on-die programmable and architecturally-visible storage.

FIG. 5 is a block diagram of an embodiment of a model specific register (MSR) 552 that is operable to store information about an on-die programmable and architecturally-visible storage. The MSR represents an example embodiment of a control register. In other embodiments other control registers may be used instead. As shown, in some embodiments, the MSR may store a starting address 554 of a set of data (e.g., a datastructure) stored in the on-die programmable and architecturally-visible storage. In some embodiments, the MSR may store a size and/or extent 556 of the set of data (e.g., the datastructure) stored in the on-die programmable and architecturally-visible storage. The size and/or extent may also be expressed as an end address of the set of data. The size and/or extent may be used to determine whether an attempted access is beyond the last bit of the on-die programmable storage. Different possible ways of handling such an event are contemplated. In some cases this may cause a fault or other exceptional condition. In other cases, the attempted access may optionally be ignored, wrapped around to the beginning of the data structure, or handled otherwise.

In some embodiments, a programmer and/or software may use one or more user-level instructions of an instruction set of a processor to store the starting address and/or the extent/size in the MSR. For example, the Intel Architecture includes a write model specific register (WRMSR) instruction that is operable to write or store data in the MSR. In some embodiments, the programmer and/or the software may use one or more user-level instructions of an instruction set of a processor to read the starting address and/or the extent/size from the MSR. For example, the Intel Architecture includes a read model specific register (RDMSR) instruction that is operable to load or read data from the MSR. It is to be appreciated that storing the size and/or other information in the MSR is just one illustrative example. In other embodiments, such information about the on-die programmable architecturally visible-storage may optionally be stored in a similar way to other processor information (e.g., CPUID type of information) and accessed in a similar way (e.g., with a CPUID instruction).

Figure 6A:
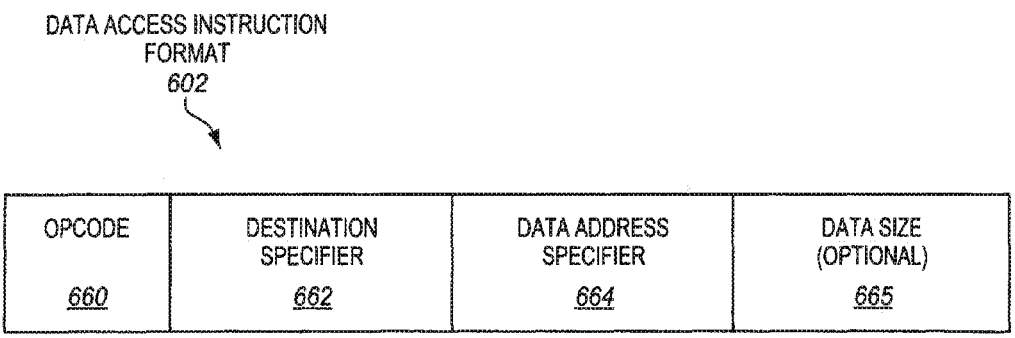
FIG. 6A is a block diagram of an embodiment of a suitable instruction format for a data access instruction.

FIG. 6A is a block diagram of an embodiment of a suitable instruction format 602 for a data access instruction (e.g., data access instruction 102). The instruction format includes an operation code or opcode 660. The opcode may represent a plurality of bits or one or more fields that are operable to identify the instruction and/or the operation to be performed (e.g., a data access operation from an on-die programmable architecturally-visible storage). The instruction format also includes a destination specifier 662, which may include bits or one or more fields to specify an address of a processor register or other destination storage location. Alternatively, in another embodiment, the destination storage location may optionally be implicit to the instruction, instead of being explicitly specified. The instruction format also includes a data address specifier 664, which may include bits or one or more fields to specify a data address, or to specify a register (e.g., a general-purpose register) storing the data address. In some embodiments, the data access instruction may optionally indicate a source packed data register having a plurality of packed potentially non-contiguous data addresses. Alternatively, in another embodiment, a register storing the data address (or optionally data addresses) may optionally be implicitly indicated by the instruction, instead of being explicitly specified. In some embodiments, there may optionally be multiple on-die programmable architecturally-visible storage and/or multiple tables or other data structures, and the instruction may be able to indicate a particular on-die storage and/or data structure (e.g., have a field to specify it or have it be implied or implicit to the opcode/instruction). The instruction format also includes a data size specifier 665, which may include bits or one or more fields to specify a data size. Alternatively, in another embodiment, the data size may optionally be implicitly indicated by the instruction. For example, the opcode of the instruction may correspond to a particular fixed data size.

Figure 6B:
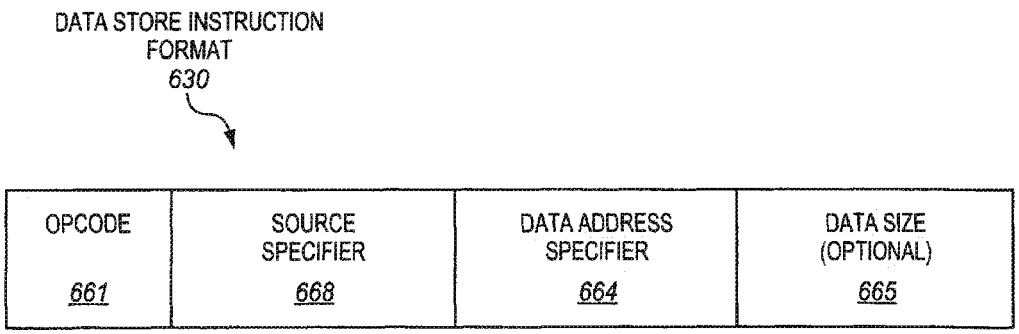
FIG. 6B is a block diagram of an embodiment of a suitable instruction format for a data store instruction.

FIG. 6B is a block diagram of an embodiment of a suitable instruction format 630 for a data store instruction (e.g., data store instruction 330). The instruction format includes an operation code or opcode 661. The opcode may represent a plurality of bits or one or more fields that are operable to identify the instruction and/or the operation to be performed (e.g., a data store operation to store data to an on-die programmable architecturally-visible storage). The instruction format also includes a source specifier 668, which may include bits or one or more fields to specify an address of a processor register, a memory location, or other source storage location having the data. Alternatively, in another embodiment, the source storage location may optionally be implicit to the instruction, instead of being explicitly specified. The instruction format also includes a data address specifier 664, which may include bits or one or more fields to specify a data address, or to specify a register (e.g., a general-purpose register) storing the data address. Alternatively, in another embodiment, a register storing the data address may optionally be implicitly indicated by the instruction, instead of being explicitly specified. In some embodiments, there may optionally be multiple on-die programmable architecturally-visible storage and/or multiple data structures and the instruction may be able to indicate the appropriate on-die storage and/or data structure either explicitly or implicitly. The instruction format also includes a data size specifier 665, which may include bits or one or more fields to specify a data size. Alternatively, in another embodiment, the data size may optionally be implicitly indicated by the instruction. For example, the opcode of the instruction may correspond to a particular fixed data size.

The instruction formats of FIGS. 6A/B are illustrative examples but are not required. Alternate embodiments may include a subset of the mentioned fields, may add additional fields, may overlap certain fields, and may rearrange or reorder the fields. Further, the fields need not include contiguous sequences of bits, but rather may be composed of non-contiguous or separated bits.

Components, features, and details described for any of FIGS. 3-6 may also optionally be used in any of FIGS. 1-2, and components, features, and details described for any of FIGS. 5-6 may also optionally be used in FIG. 3. Moreover, components, features, and details described herein for any of the apparatus described herein may also optionally be used in and/or apply to any of the methods described herein, which in embodiments may be performed by and/or with such apparatus. Any of the processors described herein may be included in any of the computer systems or other systems disclosed herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and Out-of-order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
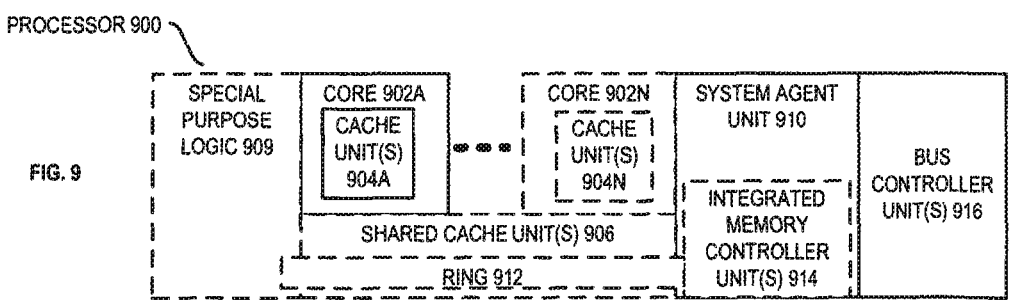
FIG. 9 is a block diagram of a processor that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
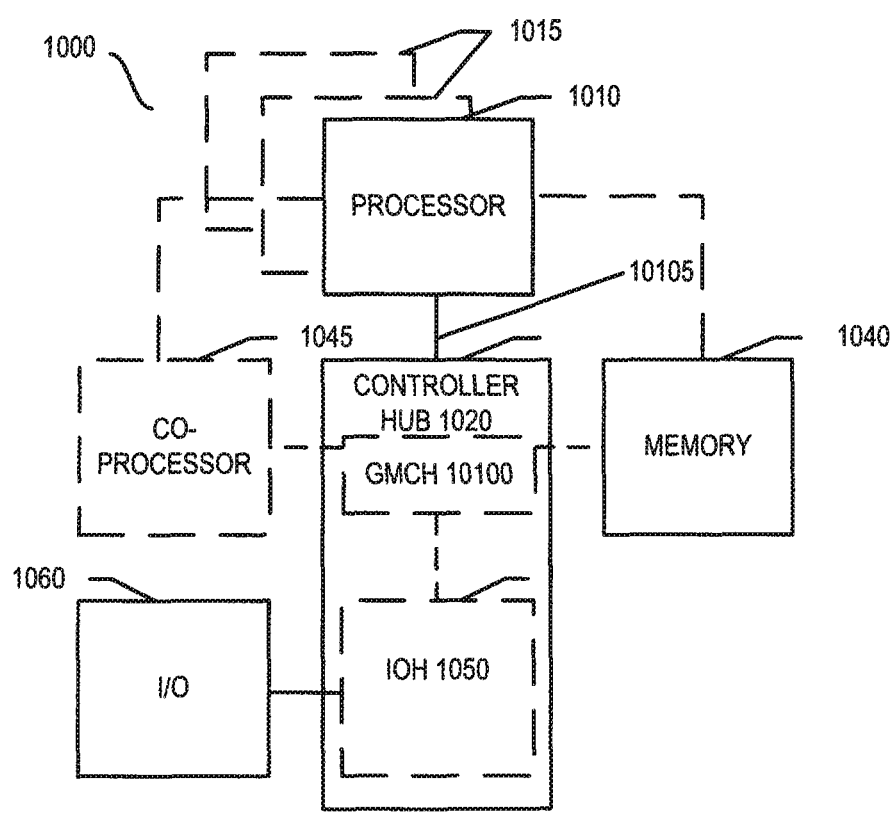
FIG. 10 shown is a block diagram of a system in accordance with one embodiment of the present invention.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
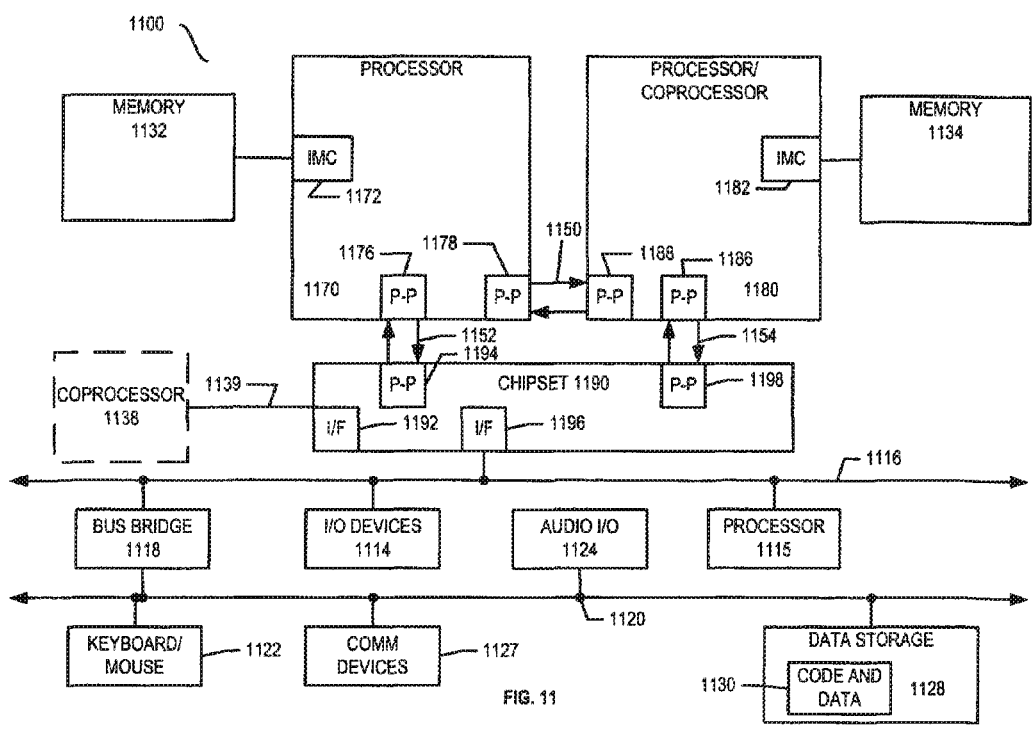
FIG. 11 shown is a block diagram of a first more specific exemplary system in accordance with an embodiment of the present invention.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
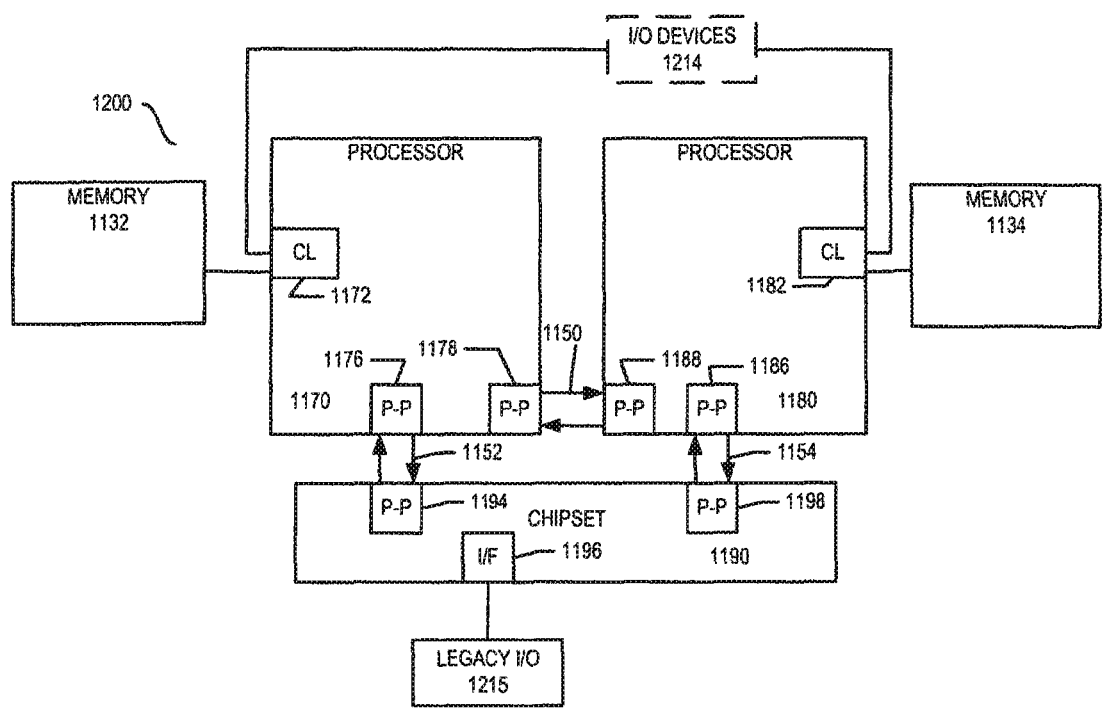
FIG. 12 shown is a block diagram of a second more specific exemplary system in accordance with an embodiment of the present invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
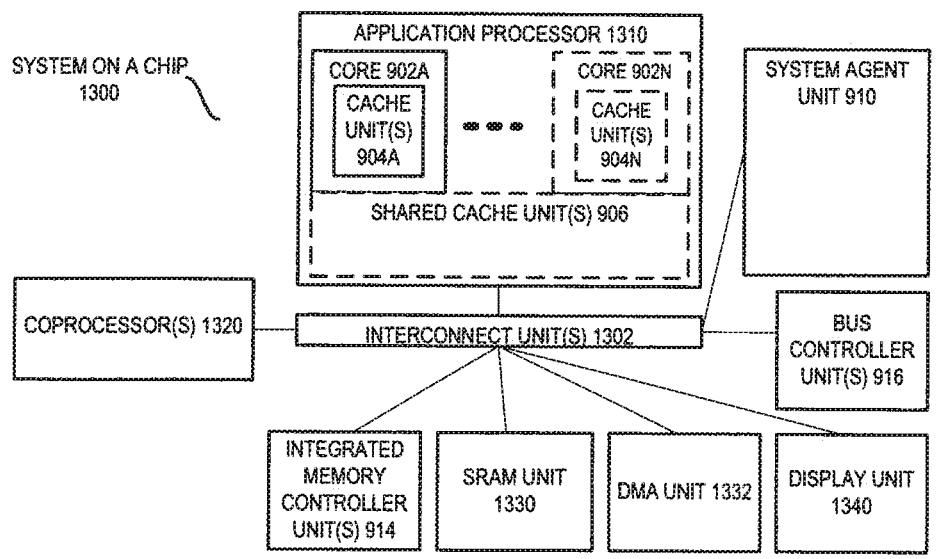
FIG. 13 shown is a block diagram of a SoC in accordance with an embodiment of the present invention.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
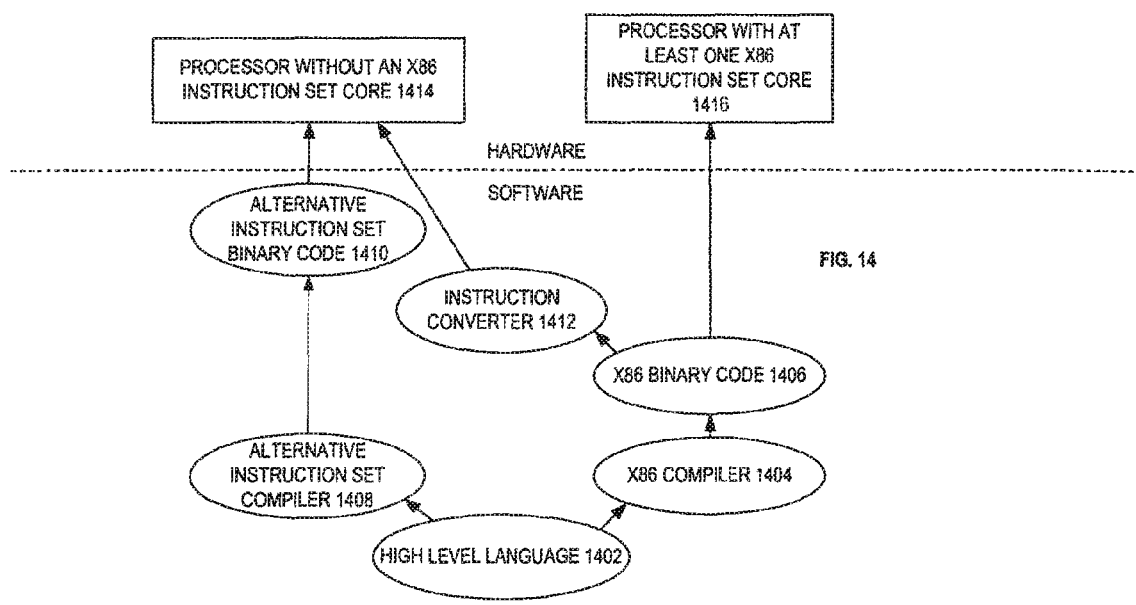
FIG. 14 is a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

In the description and/or claims, the terms "logic," "unit," "module," or "component," may have been used. Each of these terms may be used to refer to hardware, firmware, software, or various combinations thereof. In example embodiments, each of these terms may refer to integrated circuitry, application specific integrated circuits, analog circuits, digital circuits, programmed logic devices, memory devices including instructions, and the like, and various combinations thereof. In some embodiments, these may include at least some hardware (e.g., transistors, gates, other circuitry components, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise. In some cases, where multiple components have been shown and described, they may instead optionally be integrated together as a single component. In other cases, where a single component has been shown and described, it may optionally be separated into two or more components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may provide, for example store, one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor or other apparatus that includes an on-die programmable architecturally-visible storage. The processor or apparatus also includes a decode unit to receive a data access instruction of an instruction set of the processor. The data access instruction is to indicate a data address that is to be associated with data to be stored in the on-die programmable architecturally-visible storage, to indicate a data size associated with the data to be stored in the on-die programmable architecturally-visible storage, and to indicate a destination storage location of the processor. An execution unit of the processor or apparatus is coupled with the decode unit and the on-die programmable architecturally-visible storage. The execution unit is on-die with the on-die programmable architecturally-visible storage. The execution unit is operable, in response to the data access instruction, to store the data, which is associated with the data address and the data size, in the destination storage location that is to be indicated by the instruction.

Example 2 includes the processor of Example 1 and optionally in which the decode unit is to decode the data access instruction which is a user-level instruction.

Example 3 includes the processor of any preceding example and optionally in which the on-die programmable architecturally-visible storage includes a type of storage that data can be stored in after manufacture of the processor.

Example 4 includes the processor of any preceding example and optionally in which the on-die programmable architecturally-visible storage includes a static random access memory (SRAM).

Example 5 includes the processor of any preceding example and optionally in which the decode unit is also to receive a data store instruction of the instruction set of the processor. The data store instruction is to indicate a source operand that is to include a second data that is to be stored in the on-die programmable architecturally-visible storage, to indicate a second data address that is to indicate where the second data is to be stored in the on-die programmable architecturally-visible storage, and to indicate a second data size that is to indicate a size of the second data. The processor is operable, in response to the data store instruction, to store the second data in the on-die programmable architecturally-visible storage at a location that is indicated by the second data address.

Example 6 includes the processor of Example 5 and optionally in which the data store instruction includes a user-level instruction, and in which the source operand is to comprise a memory location.

Example 7 includes the processor of any of Examples 1-4 and optionally in which the on-die programmable architecturally-visible storage is configured to be programmed to store the data by direct memory access (DMA).

Example 8 includes the processor of any preceding example and optionally in which the decode unit is to decode the data access instruction which has one or more bits to explicitly specify the data size.

Example 9 includes the processor of any of Examples 1-7 and optionally in which the decode unit is to decode the data access instruction which implicitly indicates but does not explicitly specify the data size.

Example 10 includes the processor of any preceding example and optionally in which the decode unit is to decode the data access instruction which is to indicate the data size which is capable of being any one 8-bits, 16-bits, 32-bits, and 64-bits.

Example 11 includes the processor of any preceding example and optionally further including at least one data cache having a cache data replacement mechanism, and in which the on-die programmable architecturally-visible storage does not have a cache data replacement mechanism.

Example 12 includes the processor of any preceding example and optionally further including a model specific register to store a start of a data structure in the on-die programmable architecturally-visible storage and a size of the data structure.

Example 13 includes the processor of any preceding example and optionally in which the data address represents an offset from a first data stored in the on-die programmable architecturally-visible storage to the data associated with the data address.

Example 14 is a method in a processor that includes receiving a data access instruction of an instruction set of the processor. The data access instruction indicating a data address that is to be associated with data to be stored in an on-die programmable architecturally-visible storage of the processor, indicating a data size associated with the data to be stored in the on-die programmable architecturally-visible storage, and indicating a destination storage location of the processor. The method also includes storing the data, which is associated with the data address and the data size, in the destination storage location indicated by the data access instruction in response to the data access instruction.

Example 15 includes the method of Example 14 and optionally further including storing the data in the on-die programmable architecturally-visible storage while the processor is decoding and executing instructions.

Example 16 includes the method of Example 15 and optionally in which storing the data in the on-die programmable architecturally-visible storage includes performing a user-level data store instruction of the instruction set of the processor. The user-level data store instruction indicating a source operand having the data, indicating a second data address that is equal to the data address of the data access instruction, and indicating a second data size that is equal to the data size of the data access instruction. Performing the user-level data store instruction includes storing the data in the on-die programmable architecturally-visible storage at a location that is indicated by the second data address.

Example 17 includes the method of Example 15 and optionally in which storing the data in the on-die programmable architecturally-visible storage includes storing the data in the on-die programmable architecturally-visible storage from a datastructure stored in memory through by direct memory access (DMA).

Example 18 includes the method of any preceding example and optionally in which receiving the instruction includes receiving a user-level data access instruction associated with user-level software.

Example 19 includes the method of any preceding example and optionally further including accessing the data from the on-die programmable architecturally-visible storage which includes a static random access memory (SRAM).

Example 20 includes the method of any preceding example and optionally in which receiving the instruction includes receiving the data access instruction that has one or more bits to explicitly specify the data size.

Example 21 includes the method of any of examples 14-19 and optionally in which receiving the instruction includes receiving the data access instruction that implicitly indicates, but does not explicitly specify, the data size.

Example 22 includes the method of any preceding example and optionally further including storing a datastructure having the data in the on-die programmable architecturally-visible storage while the processor is operating in an electronic device. The datastructure stores one of a set of values for a transcendental function, a set of coefficients for an algorithm, and a logic truth table.

Example 23 includes the method of any preceding example and optionally further including performing a user-level instruction to store a start of a data structure, which includes the data, and which is stored in the on-die programmable architecturally-visible storage, in a model specific register. Also, performing a user-level instruction to store a size of the data structure in the model specific register.

Example 24 is a system to process instructions that includes an interconnect and a processor coupled with the interconnect. The processor is to receive a data access instruction that is to indicate a data address that is to be associated with data to be stored in an on-die programmable architecturally-visible storage of the processor, to indicate a data size associated with the data to be stored in the on-die programmable architecturally-visible storage, and to indicate a destination storage location of the processor. The processor is operable, in response to the data access instruction to store the data, which is associated with the data address and the data size, in the destination storage location that is to be indicated by the instruction. The system also includes a dynamic random access memory (DRAM) coupled with the interconnect. The DRAM may optionally store a datastructure that is to include the data. The datastructure may optionally include a set of values for a transcendental function. The DRAM may also optionally store an algorithm that is to use the transcendental function.

Example 25 includes the system of Example 24 and optionally in which the processor is to store the data in the on-die programmable architecturally-visible storage by performing a user-level data store instruction.

Example 26 is an article of manufacture that includes a non-transitory machine-readable storage medium. The non-transitory machine-readable storage medium stores a data access instruction. The data access instruction is to indicate a data address that is to be associated with data to be stored in an on-die programmable architecturally-visible storage of a processor, is to indicate a data size associated with the data to be stored in the on-die programmable architecturally-visible storage, and is to indicate a destination storage location of the processor. The data access instruction if executed by a machine is operable to cause the machine to perform operations including storing the data, which is associated with the data address and the data size, in the destination storage location that is to be indicated by the data access instruction.

Example 27 includes the article of manufacture of Example 26 and optionally in which the non-transitory machine-readable storage medium also stores a user-level data store instruction. The user-level data store instruction if executed by the machine is operable to cause the machine to perform operations including storing the data in the on-die programmable architecturally-visible storage of a processor.

Example 28 includes the processor of any preceding example and optionally in which the data size is less than one 8-bit byte.

Example 29 includes the processor of any preceding example and optionally in which the data access instruction is to indicate a plurality of data addresses associated with a plurality of data stored in potentially non-contiguous locations of the on-die programmable architecturally-visible storage, and wherein the execution unit, in response to the data access instruction, is to store each of the plurality of data in the destination storage location.

Example 30 includes the processor of any preceding example and optionally in which the destination storage location is to comprise a packed data operand that is to have a plurality of packed data elements to include the plurality of data.

Example 31 includes a processor or other apparatus that is operable to perform the method of any of Examples 14-23.

Example 32 includes a processor or other apparatus that includes means for performing the method of any of Examples 14-23.

Example 33 includes a processor that includes modules, units, logic, circuitry, means, or any combination thereof, to perform the method of any of Examples 14-23.

Example 34 includes a computer system or other electronic device including an interconnect, a processor coupled with the interconnect, and at least one component coupled with the interconnect that is selected from a DRAM, a graphics chip, a wireless communications chip, a phase change memory, and a video camera, the computer system or other electronic device to perform the method of any of Examples 14-23.

Example 35 includes an optionally non-transitory machine-readable medium that optionally stores or otherwise provides an instruction that if and/or when executed by a processor, computer system, or other machine is operable to cause the machine to perform the method of any of Examples 14-23.

Example 36 includes a processor or other apparatus that is operable to perform one or more operations or any method substantially as described herein.

Example 37 includes a processor or other apparatus including means for performing one or more operations or any method substantially as described herein.

Example 38 includes a processor or other apparatus that is operable to perform any of the instructions substantially as described herein.

Example 39 includes a processor or other apparatus including means for performing any of the instructions substantially as described herein.

Example 40 includes a method that includes converting a first instruction, which may be any of the instructions substantially as disclosed herein, and which is of a first instruction set, into one or more instructions of a second instruction set. The method also includes decoding and executing the one or more instructions of the second instruction set on a processor. The executing includes storing a result in a destination. The result may include any of the results substantially as disclosed herein for the first instruction.

Example 41 includes a processor or other apparatus including a decode unit that is operable to decode instructions of a first instruction set. The decode unit is to receive one or more instructions that emulate a first instruction, which may be any of the instructions substantially as disclosed herein, and which is to be of a second instruction set. The processor or other apparatus also includes one or more execution units coupled with the decode unit to execute the one or more instructions of the first instruction set. The one or more execution units in response to the one or more instructions of the first instruction set are operable to store a result in a destination. The result may include any of the results substantially as disclosed herein for the first instruction.

Example 42 includes a computer system or other electronic device that includes a processor having a decode unit that is operable to decode instructions of a first instruction set, and having one or more execution units. The computer system also includes a storage device coupled to the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when executed by the processor, are operable to cause the processor to store a result in a destination. The result may include any of the results substantially as disclosed herein for the first instruction.

What is claimed is:

1. A processor comprising:
   an on-die programmable architecturally-visible storage;
   a decode unit to receive a data access instruction of an instruction set of the processor, the data access instruction to indicate a data address that is to be associated with data to be stored in the on-die programmable architecturally-visible storage, to indicate a data size associated with the data to be stored in the on-die programmable architecturally-visible storage, and to indicate a destination storage location of the processor; and
   an execution unit coupled with the decode unit and the on-die programmable architecturally-visible storage, the execution unit on-die with the on-die programmable architecturally-visible storage, the execution unit operable, in response to the data access instruction, to store the data, which is associated with the data address and the data size, in the destination storage location that is to be indicated by the instruction, wherein the destination storage location comprises an architectural register of the processor.

2. The processor of claim 1, wherein the decode unit is to decode the data access instruction which is a user-level instruction.

3. The processor of claim 1, wherein the on-die programmable architecturally-visible storage comprises a type of storage that data can be stored in after manufacture of the processor.

4. The processor of claim 1, wherein the on-die programmable architecturally-visible storage comprises a type of random access memory (RAM).

5. The processor of claim 1:
   wherein the decode unit is also to receive a data store instruction of the instruction set of the processor, the data store instruction to indicate a source operand that is to include a second data that is to be stored in the on-die programmable architecturally-visible storage, a second data address that is to indicate where the second data is to be stored in the on-die programmable architecturally-visible storage, and a second data size that is to indicate a size of the second data; and
   wherein the processor is operable, in response to the data store instruction, to store the second data in the on-die programmable architecturally-visible storage at a location that is indicated by the second data address.

6. The processor of claim 5, wherein the data store instruction comprises a user-level instruction, and wherein the source operand is to comprise a memory location.

7. The processor of claim 1, wherein the on-die programmable architecturally-visible storage is configured to be programmed to store the data by direct memory access (DMA).

8. The processor of claim 1, wherein the decode unit is to decode the data access instruction which has one or more bits to explicitly specify the data size.

9. The processor of claim 1, wherein the decode unit is to decode the data access instruction which implicitly indicates but does not explicitly specify the data size.

10. The processor of claim 1, wherein the decode unit is to decode the data access instruction which is to indicate the data size which is capable of being any one of a plurality selected from 8-bits, 16-bits, 32-bits, and 64-bits.

11. The processor of claim 1, further comprising at least one data cache having an autonomous data replacement mechanism, and wherein the on-die programmable architecturally-visible storage does not have an autonomous data replacement mechanism.

12. The processor of claim 1, further comprising a model specific register to store a start of a data structure in the on-die programmable architecturally-visible storage and a size of the data structure.

13. The processor of claim 1, wherein the data address represents an offset from a first data stored in the on-die programmable architecturally-visible storage to the data associated with the data address.

14. A method in a processor, the method comprising:
    receiving a data access instruction of an instruction set of the processor, the data access instruction indicating a data address that is to be associated with data to be stored in an on-die programmable architecturally-visible storage of the processor, indicating a data size associated with the data to be stored in the on-die programmable architecturally-visible storage, and indicating a destination storage location of the processor; and
    storing the data, which is associated with the data address and the data size, in the destination storage location indicated by the data access instruction in response to the data access instruction, wherein the destination storage location comprises a register of the processor.

15. The method of claim 14, further comprising storing the data in the on-die programmable architecturally-visible storage while the processor is decoding and executing instructions.

16. The method of claim 15, wherein storing the data in the on-die programmable architecturally-visible storage comprises performing a user-level data store instruction of the instruction set of the processor, the user-level data store instruction indicating a source operand having the data, indicating a second data address that is equal to the data address of the data access instruction, and indicating a second data size that is equal to the data size of the data access instruction, and wherein performing the user-level data store instruction includes storing the data in the on-die programmable architecturally-visible storage at a location that is indicated by the second data address.

17. The method of claim 14, wherein storing the data in the on-die programmable architecturally-visible storage comprises storing the data in the on-die programmable architecturally-visible storage from a datastructure stored in memory by direct memory access (DMA).

18. The method of claim 14, wherein receiving the instruction comprises receiving a user-level data access instruction associated with user-level software.

19. The method of claim 14, further comprising accessing the data from the on-die programmable architecturally-visible storage which comprises a type of random access memory (RAM), and wherein the data size is less than one 8-bit byte.

20. The method of claim 14, wherein receiving the instruction comprises receiving the data access instruction that has one or more bits to explicitly specify the data size.

21. The method of claim 14, wherein receiving the instruction comprises receiving the data access instruction that implicitly indicates, but does not explicitly specify, the data size.

22. The method of claim 14, further comprising storing a datastructure having the data in the on-die programmable architecturally-visible storage while the processor is operating in an electronic device, the datastructure storing one of a set of values for a transcendental function, a set of coefficients for an algorithm, and a logic truth table.

23. The method of claim 14, further comprising:
performing a user-level instruction to store a start of a data structure, which includes the data, and which is stored in the on-die programmable architecturally-visible storage, in a model specific register; and
performing a user-level instruction to store a size of the data structure in the model specific register.

24. A system to process instructions comprising:
an interconnect;
a processor coupled with the interconnect, the processor to receive a data access instruction that is to indicate a data address that is to be associated with data to be stored in an on-die programmable architecturally-visible storage of the processor, to indicate a data size associated with the data to be stored in the on-die programmable architecturally-visible storage, and to indicate a destination storage location of the processor, the processor operable, in response to the data access instruction to store the data, which is associated with the data address and the data size, in the destination storage location that is to be indicated by the instruction; and
a dynamic random access memory (DRAM) coupled with the interconnect, the DRAM to store a datastructure that is to include the data, wherein the datastructure is to comprise a set of values for a transcendental function, the DRAM also to store an algorithm that is to use the transcendental function.

25. The system of claim 24, wherein the processor is to store the data in the on-die programmable architecturally-visible storage by performing a user-level data store instruction.

26. An article of manufacture comprising a non-transitory machine-readable storage medium, the non-transitory machine-readable storage medium storing a data access instruction, the data access instruction to indicate a data address that is to be associated with data to be stored in an on-die programmable architecturally-visible storage of a processor, to indicate a data size associated with the data to be stored in the on-die programmable architecturally-visible storage, and to indicate a destination storage location of the processor, the data access instruction if executed by a machine operable to cause the machine to perform operations comprising:
storing the data, which is associated with the data address and the data size, in the destination storage location that is to be indicated by the data access instruction, wherein the destination storage location comprises a register of the processor.

27. The article of claim 26, wherein the non-transitory machine-readable storage medium also stores a user-level data store instruction, the user-level data store instruction if executed by the machine operable to cause the machine to perform operations comprising:
storing the data in the on-die programmable architecturally-visible storage of the processor.

28. The processor of claim 1, wherein the data has the data size which is less than one byte.

29. The processor of claim 1, wherein the data access instruction is to indicate a plurality of data addresses associated with a plurality of data to be stored in potentially non-contiguous locations of the on-die programmable architecturally-visible storage, and wherein the execution unit, in response to the data access instruction, is to store each of the plurality of data in the indicated destination storage location.

30. The processor of claim 29, wherein the destination storage location is to comprise a packed data register that is to have a plurality of packed data elements to include the plurality of data.

31. The processor of claim 1, wherein the data is to include one of a value of a transcendental function, a coefficient of an algorithm, and a value of a user-defined logic truth table.

32. The processor of claim 1, wherein the on-die programmable architecturally-visible storage is writable at runtime responsive to a user-level instruction.

* * * * *